(12) United States Patent
Lång et al.

(10) Patent No.: US 9,959,004 B2
(45) Date of Patent: May 1, 2018

(54) DEFORMATION SENSOR

(71) Applicant: Microsoft Technology Licensing, LLC, Redmond, WA (US)

(72) Inventors: Jouko Juho Kalevi Lång, Lieto (FI); Vicente Calvo Alonso, Piispanristi (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 14/939,580

(22) Filed: Nov. 12, 2015

(65) Prior Publication Data

US 2017/0139510 A1 May 18, 2017

(51) Int. Cl.
*G06F 3/045* (2006.01)
*G01L 5/00* (2006.01)
*G01B 7/16* (2006.01)
*G01L 1/22* (2006.01)

(52) U.S. Cl.
CPC ............... *G06F 3/045* (2013.01); *G01B 7/18* (2013.01); *G01L 1/2287* (2013.01); *G01L 5/0038* (2013.01)

(58) Field of Classification Search
CPC .................. G06F 3/041; G06F 3/044; G06F 2203/04102; G06F 2203/04103
See application file for complete search history.

(56) References Cited

U.S. PATENT DOCUMENTS

| | | | |
|---|---|---|---|
| 5,989,700 A | 11/1999 | Krivopal | |
| 7,258,026 B2 | 8/2007 | Papakostas et al. | |
| 8,062,596 B2 | 11/2011 | Yun et al. | |
| 8,669,952 B2 | 3/2014 | Hashimura et al. | |
| 8,730,186 B2 | 5/2014 | Tamura et al. | |
| 8,766,925 B2 | 7/2014 | Perlin et al. | |
| 2004/0239475 A1 | 12/2004 | Hermann et al. | |
| 2005/0268699 A1* | 12/2005 | Papakostas | G01L 1/20 73/46 |
| 2009/0273573 A1* | 11/2009 | Hotelling | G06F 3/0362 345/173 |
| 2010/0033354 A1 | 2/2010 | Ejlersen | |
| 2011/0006787 A1 | 1/2011 | Kadono | |
| 2011/0108838 A1* | 5/2011 | Kageyama | B06B 1/0292 257/49 |
| 2013/0104665 A1 | 5/2013 | Biris et al. | |
| 2013/0147739 A1* | 6/2013 | Berg | G06F 3/0488 345/173 |
| 2014/0168139 A1 | 6/2014 | Ku | |

(Continued)

OTHER PUBLICATIONS

"Force sensor", May 7, 2015 Available at; http://www.nissha.com/english/products/dev/input/force.html.

(Continued)

*Primary Examiner* — Shaheda Abdin
(74) *Attorney, Agent, or Firm* — Alleman Hall Creasman & Tuttle LLP

(57) ABSTRACT

A deformation sensor comprises at least two electrodes on the surface of a substrate. The electrodes are separated by a gap, and the electrodes are arranged so that the gap comprises at least a part of a closed geometric shape. The gap contains a material loaded with conductive or semiconductive nanoparticles, whereby deformation of the substrate causes the resistance between the at least two electrodes to change.

18 Claims, 12 Drawing Sheets

(56) References Cited

U.S. PATENT DOCUMENTS

2014/0204285 A1 7/2014 Jang et al.
2014/0238153 A1 8/2014 Wood et al.

OTHER PUBLICATIONS

"Resistive-type Touch Panel", Published on: Oct. 5, 2013 Available at: http://www.nissha.com/english/products/dev/input/resi.html.
Walker, Geoff, "Part 1: Fundamentals of Projected-Capacitive Touch Technology", Published on: Jun. 1, 2014 Available at: http://www.walkermobile.com/Touch_Technologies_Tutorial_Latest_Version.pdf.
"AN2869 Application note—Guidelines for designing touch sensing applications", Published on: May 2012 Available at: http://www.st.com/web/en/resource/technical/document/application_note/CD00222015.pdf.
"QTAN0079—Button, Sliders and Wheels—Sensor Design Guide", Published on: May 27, 2015 Available at: http://www.atmel.com/images/doc10752.pdf.
ISA European Patent Office, International Search Report and Written Opinion Issued in PCT Application No. PCT/US2016/060421, dated Feb. 6, 2017, WIPO, 10 Pages.
"International Preliminary Report on Patentability Issued in PCT Application No. PCT/US2016/060421", dated Jul. 27, 2017, 7 Pages.

\* cited by examiner

DEFORMATION SENSOR

BACKGROUND

There are many applications where it is desirable to be able to sense the deformation of a member. One such application is a touch sensitive panel for use as an input device for a computing device, where it may be desirable to identify the position on the touch sensitive panel of a user touch and possibly the amount of force or pressure of the user touch. If a touch sensitive surface of the touch sensitive panel is formed by a flexible member and the deformation of the flexible member can be sensed with sufficient accuracy it may be possible to determine a location on the touch sensitive panel of a user touch, and possibly also the amount of force of the user touch from the sensed deformation. A touch sensitive panel allows a user to input a command to a computing device by using their fingers or other objects or gestures. Where a touch sensitive input panel is intended to sense and respond to gestures such as a moving or multiple point touch it may be desirable to determine a location on the touch sensitive panel of a user touch.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A deformation sensor comprises at least two electrodes on the surface of a substrate. The electrodes are separated by a gap, and the electrodes are arranged so that the gap comprises at least a part of a closed geometric shape. The gap contains a material loaded with conductive or semiconductive nanoparticles, whereby deformation of the substrate causes the resistance between the at least two electrodes to change.

In one example, the present disclosure provides a deformation sensor comprising: a substrate; at least two electrodes on a surface of the substrate and separated by a gap, the electrodes being arranged so that the gap comprises at least one circular arc; the at least one circular arc of the gap containing a material loaded with conductive or semiconductive nanoparticles; whereby deformation of the substrate causes the resistance between the at least two electrodes to change.

In various examples, the present disclosure provides a method comprising: forming at least two electrodes on a surface of a substrate, the at least two electrodes being separated by a gap and the at least two electrodes being arranged so that the gap comprises at least a part of a geometric shape; depositing a material loaded with conductive or semiconductive nanoparticles on the surface of the substrate; wherein the at least a part of a geometric shape of the gap contains the material loaded with conductive or semiconductive nanoparticles.

In various examples, the present disclosure provides a deformation sensor comprising: a substrate; at least two electrodes on a surface of the substrate and separated by a gap, the electrodes being arranged so that the gap comprises at least one circular arc; the at least one circular arc of the gap containing a material loaded with conductive or semiconductive naonparticles; whereby deformation of the substrate causes the resistance between the at least two electrodes to change.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a touch sensitive panel, the system described is provided as an example and not a limitation. As those skilled in the art will appreciate, the present examples are suitable for application in a variety of different types of deformation or pressure sensing systems.

Figure 1:
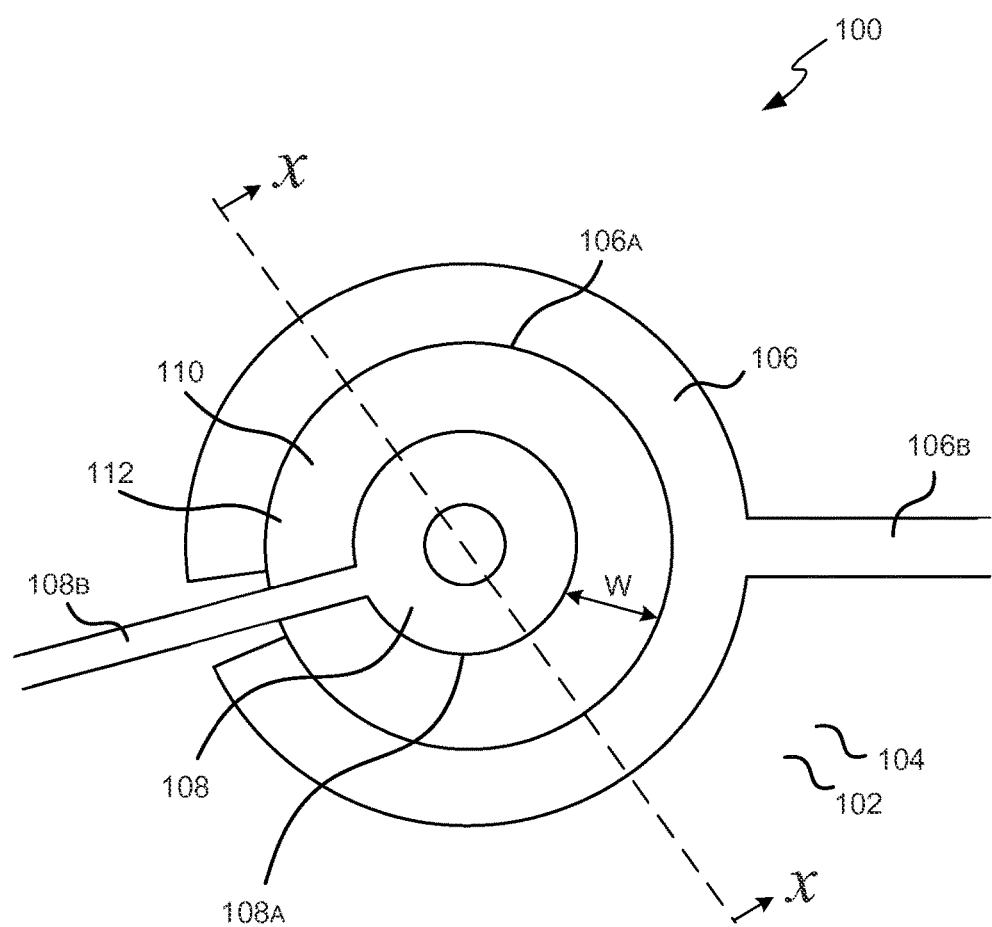
FIG. 1 illustrates a plan view of a schematic representation of a deformation sensor according to an illustrative example.
Figure 2:
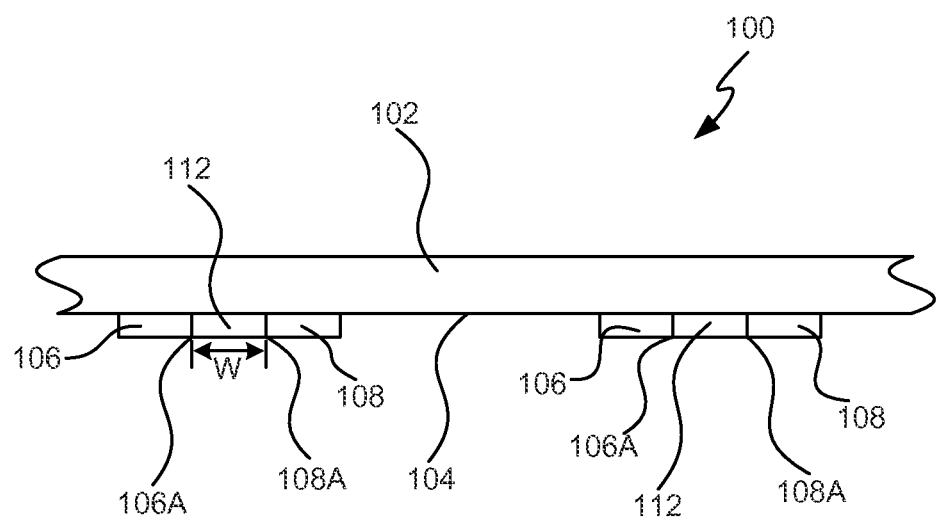
FIG. 2 illustrates a cross section of a schematic representation of a deformation sensor according to an illustrative example.

FIG. 1 illustrates a plan view of an example of a deformation sensor 100. FIG. 2 illustrates a cross-sectional view of the deformation sensor 100 along the line X-X in FIG. 1.

The deformation sensor 100 comprises a substrate 102. The deformation sensor 100 senses deformation of the substrate 102. In an example the substrate 102 may be a touch sensitive panel used as an input device for a computing device.

The substrate 102 has a surface 104, and a first electrode 106 and a second electrode 108 on the surface 104 of the substrate 102. The first and second electrodes 106 and 108 are arranged substantially concentrically with the second electrode 108 arranged inside the first electrode 106.

The first electrode 106 has an inner edge 106A, and the second electrode 108 has an outer edge 108A opposed to the inner edge 106A of the first electrode 106 so that the first and second electrodes 106 and 108 define a gap 110 between them. The gap 110 has a width W. The inner edge 106A of the first electrode 106 has a circular arc shape, and the outer edge 108A of the second electrode 108 has a circular arc shape concentric with the circular arc shape of the inner edge 106A of the first electrode 106. Accordingly, the gap 110 is substantially a circular arc shaped annulus.

The circular gap 110 is filled by an annulus 112 of variable resistance ink on the surface 104 of the substrate 102, so that the annulus 112 of variable resistance ink has a width W. Thus, the first electrode 106 and the second electrode 108 are electrically connected by the variable resistance ink with a path length through the variable resistance ink between the first electrode 106 and the second electrode 108 being W throughout.

The variable resistance ink is loaded with conductive or semiconductive nanoparticles and has a resistivity which varies in a consistent and predictable manner in response to mechanical deformation of the variable resistance ink. According to an example the resistivity of the variable resistance ink increases when the variable resistance ink is stretched, and the resistivity of the variable resistance ink decreases when the variable resistance ink is compressed.

A first conductive trace 106B connected to the first electrode 106 and a second conductive trace 108B connected to the second electrode 108 are also provided on the surface 104 of the substrate 100. The first and second conductive traces 106B and 108B provide electrical connections to the first and second electrodes 106 and 108 so that the resistance between them can be measured.

The first electrode 106 has a gap to allow the second conductive trace 108B to pass through the first electrode 106.

Figure 3:
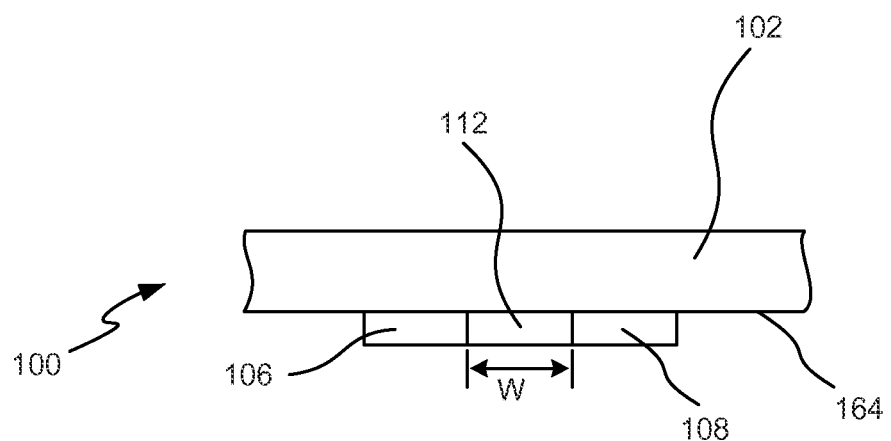
FIG. 3 illustrates a schematic representation of a deformation sensor according to an illustrative example in a condition.
Figure 4:
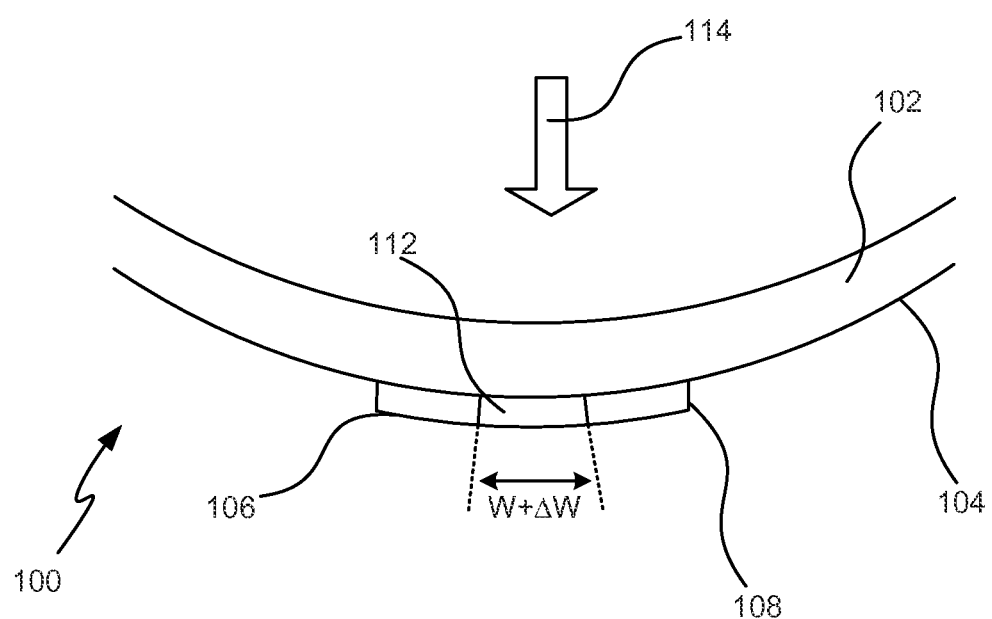
FIG. 4 illustrates a schematic representation of a deformation sensor according to an illustrative example in another condition.

FIG. 3 is an illustrative example of a partial cross-sectional view of the deformation sensor 100 in a first condition where the substrate 102 is not deformed. FIG. 4 is an illustrative example of a partial cross-sectional view of the deformation sensor 100 in a second condition where the substrate 102 is deformed by an applied pressure force 114. In an example where the substrate 102 is a touch sensitive panel used as an input device for a computing device the applied force 114 may be a force or pressure applied to the touch sensitive panel by a user touch, for example by a finger of a user, or other object.

As is illustrated in FIG. 3, in the first condition where the substrate 102 is not deformed the annulus 112 of variable resistance ink electrically connecting the first and second electrodes 106 and 108 has a width W. As is illustrated in FIG. 4, in the second condition where the substrate 102 is deformed the deformation of the substrate 102 causes a corresponding deformation of the annulus 112 of variable resistance ink. This deformation of the variable resistance ink causes the resistivity of the variable resistance ink to change, which causes the electrical resistance between the first electrode 106 and the second electrode 108 to change.

Accordingly, the amount of deformation of the substrate 102 can be determined from measurements of the resistance between the first and second electrodes 106 and 108.

In an example the amount of force or pressure applied to the substrate 102 can be determined from the determined amount of deformation. In an example the amount of force or pressure applied to the substrate 102 can be determined from the measurements of the resistance between the first and second electrodes 106 and 108.

In the exemplary geometry illustrated in FIGS. 3 and 4 where the applied force 114 is a pressure force applied to an opposite side of the substrate 102 to the surface 104 on which the first electrode 106, the second electrode 108, and the annulus 112 of variable resistance ink are located, the surface 104 is deformed by the applied force 114 into a convex shape and parts of the annulus 112 of variable resistance ink on the surface 114 are stretched. As a result, the width W of parts of the annulus 112 of variable resistance ink electrically connecting the first and second electrodes 106 and 108 is increased by an amount $\Delta w$ to a deformed or stretched width W+$\Delta w$. This deformation of the annulus 112 of variable resistance ink to increase its width to W+$\Delta w$ causes the resistivity of the variable resistance ink to increase, which causes the electrical resistance between the first electrode 106 and the second electrode 108 to increase.

Accordingly, the amount of deformation of the substrate 102 can be determined from measurements of the resistance between the first and second electrodes 106 and 108.

In alternative geometries, or where the applied force is not a pressure force, deformation of the substrate 102 may result in deformation of parts of the annulus 112 of variable resistance ink to decrease its width to W-$\Delta w$, causing the resistivity of the variable resistance ink to decrease, and causing the electrical resistance between the first electrode 106 and the second electrode 108 to decrease. In such alternative geometries it will still be possible to determine the amount of deformation of the substrate 102 from measurements of the resistance between the first and second electrodes 106 and 108.

Figure 5:
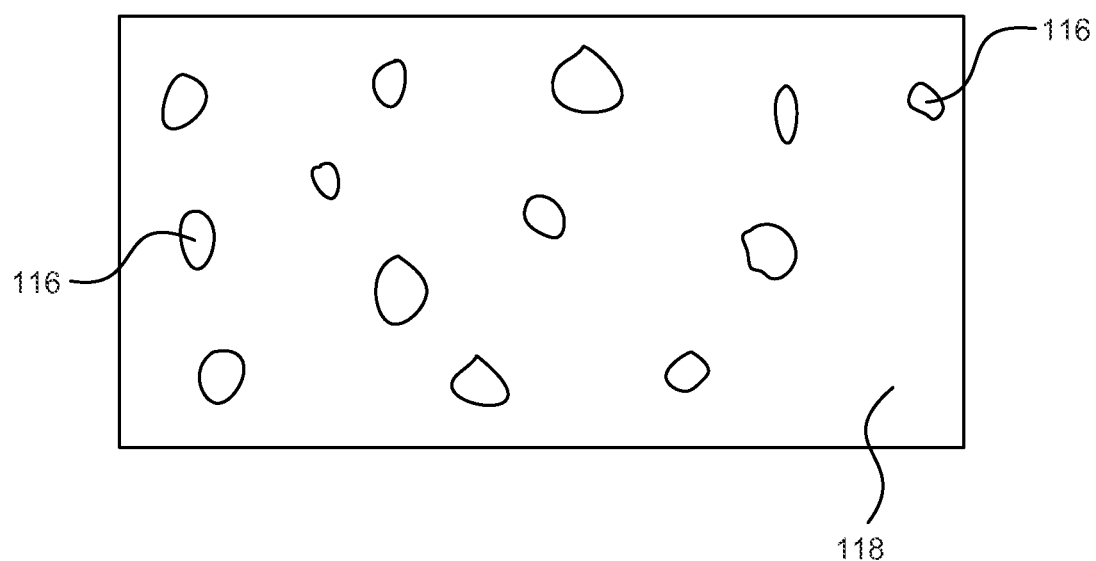
FIG. 5 illustrates a schematic representation of a variable resistance ink loaded with nanoparticles in accordance with an illustrative example.

FIG. 5 is an illustrative example of the variable resistance ink comprising nanoparticles 116 embedded in a matrix 118. In the variable resistance ink the nanoparticles 116 are functionalized nanoparticles composed of, for example, metallic and/or semiconductor, nanoparticles 116 embedded in the matrix 118. The nanoparticles 116 can be functionalized with appropriate ligand molecules to exhibit quantum mechanical (QM) tunneling between the nanoparticles 116.

When the variable resistance ink is deformed, for example, by deformation of the substrate 102, the deformation induces changes in the thickness of the matrix 118 material between the functionalized conductive or semiconductive nanoparticles 116. As a result, the distance between the functionalized nanoparticles 116 is changed and the overall resistivity of the variable resistance ink is changed. An example of a mechanism causing the resistivity change is the quantum mechanical (QM) tunneling of electrons from a nanoparticle to a neighboring nanoparticle via linking ligand molecules. More precisely, the deformation changes the difference between the nanoparticles 116 and consequently the width of the potential barrier between them, thus changing electron tunneling probability and the ability of electrons to conduct electricity within the variable resistance ink.

Classically, an electron cannot penetrate or cross a potential barrier if the electrons kinetic energy is smaller than the height of the potential barrier. However, according to quantum mechanics, an electron has a finite probability density inside and/or on the other side of the potential barrier even though its kinetic energy is lower than the height of the barrier. Thus, the electron can experience a phenomenon called quantum mechanical tunneling through the barrier for reasons based in the wave-particle duality and the Heisenberg uncertainty principle of quantum mechanics.

The criteria for the QM tunneling are: wavefunction overlap between the conductors/semiconductors of the different nanoparticles, and thus a small separation between the nanoparticles; availability of the density of electron states for the tunneling electrons to occupy; and a Fermi-level disparity across the potential barrier, and thus a potential difference, for example a voltage, is needed. The resultant tunneling current is dependent on the applied voltage, and is exponentially dependent on the distance between the nanoparticles 116.

Taking into account the tunneling phenomenon, in functionalized nanoparticle materials the resistance of the material is exponentially dependent on the width of the potential barrier, and thus the distance between the nanoparticles 116.

Accordingly, deformation of the variable resistance ink will change the separation between the nanoparticles 116, changing the tunneling probability. The tunneling current is exponentially dependent on the distance between the nanoparticles 116, so that very small deformations can significantly affect the resistivity of the variable resistance ink. Consequently, the deformation sensor 100 can be made very sensitive.

Deformation of the substrate 100 will generally cause the variable resistance ink to be deformed by different amounts at different positions around the annulus. However, as a result of the circular shape of the gap 110 filled by the annulus of variable resistance ink the overall change in resistance between the first and second electrodes 106 and 108 will correspond to the amount of deformation.

The circular shape of the gap 110 and the annulus 112 of variable resistance ink ensures that for any specific amount of deformation of the substrate 102 the response of the sensor 100, that is, the change in the resistance between the first and second electrodes 106 and 108, will be the same regardless of the orientation of the deformation. For example, if the deformation of the substrate 102 of the substrate 102 takes the form of a bending around an axis in the plane of the substrate 102, for any specific amount of bending deformation about the axis the change in resistance will be the same regardless of the orientation of the axis relative to the sensor 100. In contrast, a linear gap filled with variable resistance ink would produce a varying response in dependence on the relative orientation of the linear gap and the bending axis.

The gauge factor is a measure of the sensitivity of a sensor detecting deformations, and expresses the ratio of relative change of electrical resistance to the mechanical strain of the sensor. Typically, metallic foil strain gauges have a gauge factor in the range from 2 to 5. Examples of deformation sensors as described herein may have gauge factors in the range from 10 to 100.

Figure 6:
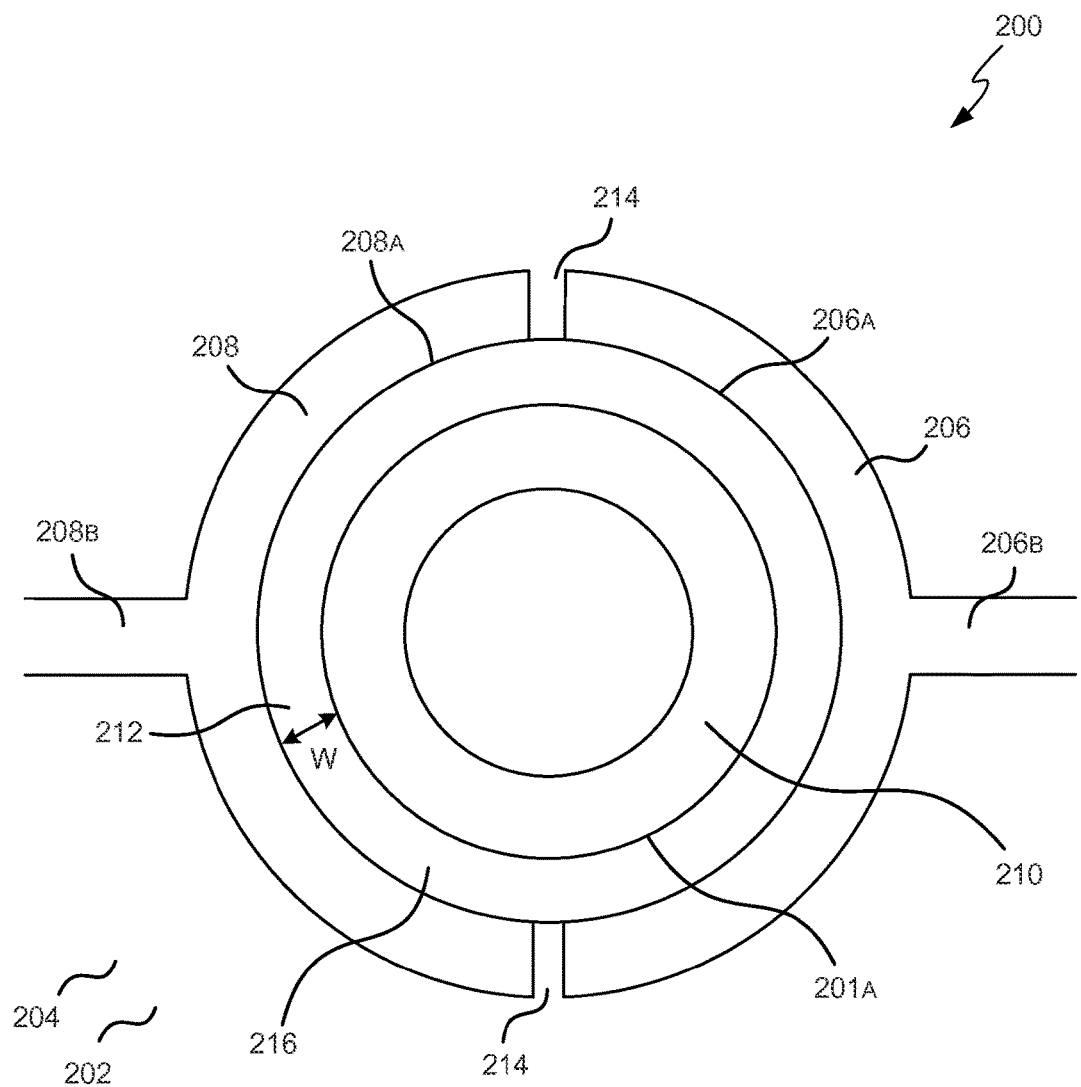
FIG. 6 illustrates a plan view of a schematic representation of a deformation sensor according to another illustrative example.

FIG. 6 illustrates a plan view of an example of a deformation sensor 200. The deformation sensor 200 comprises a substrate 202, and the deformation sensor 200 senses deformation of the substrate 202.

The substrate 202 has a surface 204, and a first electrode 206, a second electrode 208, and a third electrode 210 on the surface 204 of the substrate 202. The first and second electrodes 206 and 208 are substantially semicircular, and are arranged substantially concentrically with the third electrode 210, with the third electrode 210 arranged inside the first and second electrodes 206 and 208. The first and second electrodes are separated by two breaks 214 at diametrically opposed positions.

The first electrode 206 has an inner edge 206A, the second electrode 208 has an inner edge 208A, and the third electrode 210 has an outer edge 210A opposed to the inner edges 206A and 208A of the first and second electrodes 206 and 208 so that a circular arcuate gap 212 is defined between the first and second electrodes 206 and 208 and the third electrode 210. The gap 212 has a width W. The inner edge 206A of the first electrode 206 has a circular arc shape extending through substantially a semicircle, the inner edge 208A of the second electrode 208 has a circular arc shape extending through substantially a semicircle, and the outer edge 210A of the third electrode 210 has a circular arc shape concentric with the circular arc shapes of the inner edges 206A and 208A of the first and second electrodes 206 and 208. Accordingly, the gap 212 is substantially a circular annulus.

The gap 212 is filled by a circular annulus 216 of variable resistance ink on the surface 204 of the substrate 202. The circular annulus 216 of variable resistance ink has a width W.

Accordingly, the first electrode 206 and the third electrode 210 are electrically connected by the annulus 216 of variable resistance ink with a path length through the variable resistance ink between the first electrode 206 and the third electrode 210 being W throughout, and the second electrode 208 and the third electrode 210 are electrically connected by the annulus 216 of variable resistance ink with a path length through the variable resistance ink between the second electrode 208 and the third electrode 210 being W throughout. Thus, the first electrode 206 and the second electrode 208 are connected by electrical paths which each pass twice in electrical series through the annulus 216 of variable resistance ink at different locations with each path length through the variable resistance ink being W.

A first conductive trace 206B connected to the first electrode 206 and a second conductive trace 208B connected to the second electrode 208 are also provided on the surface 204 of the substrate 202. The first and second conductive traces 206B and 208B provide electrical connections to the first and second electrodes 206 and 208 so that the resistance between them can be measured. The third electrode 210 does not have any conductive trace to allow external connection.

If the substrate 202 is deformed, the surface 204 on which the first to third electrodes 206, 208 and 210, and the annulus 216 of variable resistance ink are located is deformed, and parts of the annulus 216 of variable resistance ink on the surface 204 are deformed. As a result, the width W of parts of the annulus 216 of variable resistance ink electrically connecting the first and second electrodes 206 and 208 to the third electrode 210 are changed to a deformed width W+Δw or W−Δw. This deformation of the annulus 216 of variable resistance ink to increase or decrease its width causes the resistivity of the variable resistance ink to increase or decrease respectively, which causes a respective increase or decrease in the electrical resistance between the first electrode 206 and the second electrode 208.

Accordingly, the amount of deformation of the substrate 202 can be determined from measurements of the resistance between the first and second electrodes 206 and 208.

As is explained above, the first electrode 206 and the second electrode 208 are connected by electrical paths which pass twice in electrical series through the annulus 216 of variable resistance ink at different locations. This may increase the amount of change in resistance between the first electrode 206 and the second electrode 208 relative to the degree of deformation of the substrate 202. This may increase the gauge factor of the sensor 200.

Figure 7:
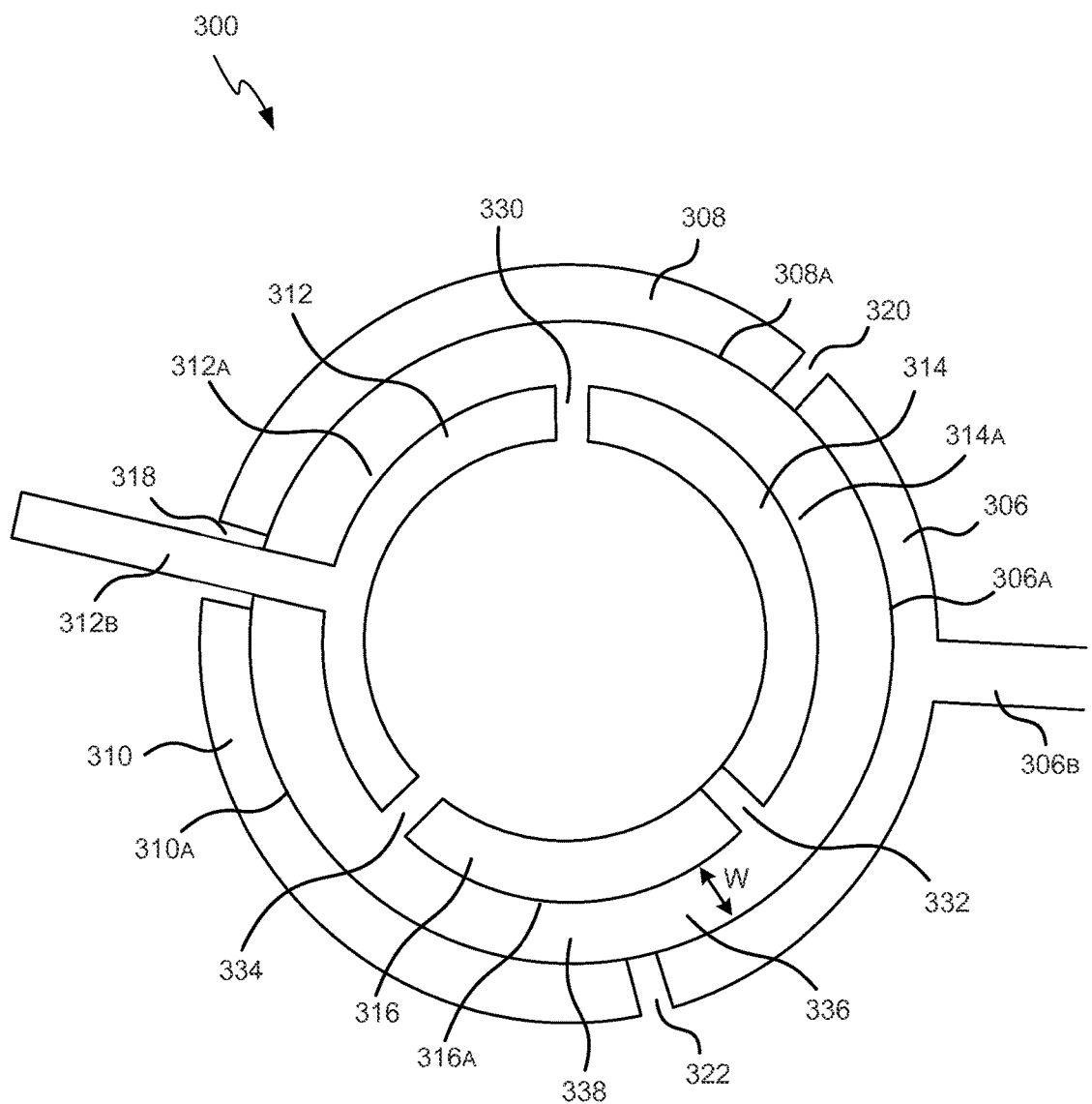
FIG. 7 illustrates a plan view of a schematic representation of a deformation sensor according to another illustrative example.

FIG. 7 illustrates a plan view of an example of a deformation sensor 300. The deformation sensor 300 comprises a substrate 302, and the deformation sensor 300 senses deformation of the substrate 302.

The substrate 302 has a surface 304, and six electrodes 306 to 316 on the surface 304 of the substrate 302. The six electrodes 306 to 316 comprise a first electrode 306, a second electrode 312, a third electrode 308, a fourth electrode 314, a fifth electrode 310, and a sixth electrode 316. The first, third and fifth electrodes 306, 308 and 310 are arranged concentrically around the second, fourth and sixth electrodes 312, 314 and 316, with the second, fourth to sixth electrodes 312 to 316 arranged inside the first, third and fifth electrodes 306 to 310. Each of the first, third and fifth electrodes 306 to 310 extends for approximately one third of a circle, and the first, third and fifth electrodes 306 to 310 are separated by three equally spaced breaks 318 to 322. Each of the second, fourth and sixth electrodes 314 to 318 extends for approximately one third of a circle, and the second, fourth and sixth electrodes 314 to 318 are separated by three equally spaced breaks 330 to 334.

The first, third and fifth electrodes 306 to 310 have respective inner edges 306A to 310A, and the second, fourth and sixth electrodes 312 to 316 have respective outer edges 312A to 316A respectively. The outer edges 312A to 316A of the second, fourth and sixth electrodes 312 to 316 are opposed to the inner edges 306A to 310A of the first, third and fifth electrodes 306 to 310 so that a circular arcuate gap 336 is defined between the first, third and fifth electrodes 306 to 310 and the second, fourth and sixth electrodes 312 to 316. The circular arcuate gap 336 has a width W. The inner edges 306A to 310A of the first, third and fifth electrodes 306 to 310 each have a circular arc shape extending through substantially a third of a circle, and the outer edges 312A to 316A of the second, fourth and sixth electrodes 312 to 316 each have a circular arc shape extending through substantially a third of a circle and concentric with the circular arc shapes of the inner edges 306A to 310A of the first, third and fifth electrodes 306 and 310. Accordingly, the gap 336 is substantially a circular arcuate annulus.

The circular arcuate gap 336 is filled by a circular annulus 338 of variable resistance ink on the surface 304 of the substrate 302. The circular annulus 338 of variable resistance ink has a width W.

Accordingly, the first electrode 306 is electrically connected to each of the fourth and sixth electrodes 314 and 316 by the annulus 338 of variable resistance ink with a path length through the variable resistance ink between the first electrode 306 and the each of the fourth and sixth electrodes 314 and 316 being W throughout. Further, the fourth electrode 314 and the third electrode 308 are electrically connected by the annulus 338 of variable resistance ink with a path length through the variable resistance ink between the fourth electrode 314 and the third electrode 308 being W throughout. Further, the sixth electrode 316 and the fifth electrode 310 are electrically connected by the annulus 338 of variable resistance ink with a path length through the variable resistance ink between the sixth electrode 316 and the fifth electrode 310 being W throughout. Finally, the third and fifth electrodes 308 and 310 are each electrically connected to the second electrode 312 by the annulus 338 of variable resistance ink with a path length through the variable resistance ink between each of the third and fifth electrodes 308 and 310 and the second electrode 312 being W throughout. Thus, the first electrode 306 and the second electrode 312 are connected by electrical paths which each pass three times in electrical series through the annulus 338 of variable resistance ink at different locations with each path length through the variable resistance ink being W.

A first conductive trace 306B connected to the first electrode 306 and a second conductive trace 312B connected to the second electrode 312 are also provided on the surface 304 of the substrate 302. The first and second conductive traces 306B and 312B provide electrical connections to the first and second electrodes 306 and 312 so that the resistance between them can be measured. The third electrode 308, fourth electrode 314, fifth electrode 310, and sixth electrode 316 do not have any conductive trace to allow external connection.

If the substrate 302 is deformed in a similar manner to the exemplary geometry shown in FIG. 4, the surface 304 on which the first to sixth electrodes 306 to 316, and the annulus 338 of variable resistance ink are located is deformed, and parts of the annulus 338 of variable resistance ink on the surface 304 are deformed. As a result, the width W of parts of the annulus 338 of variable resistance ink electrically connecting different ones of the first to sixth electrodes 306 to 316 are changed to a deformed width W+Δw or W−Δw. This deformation of the annulus 338 of variable resistance ink to increase or decrease its width causes the resistivity of the variable resistance ink to increase or decrease respectively, which causes a respective increase or decrease in the electrical resistance between the first electrode 306 and the second electrode 312.

Accordingly, the amount of deformation of the substrate 302 can be determined from measurements of the resistance between the first and second electrodes 306 and 312.

As is explained above, the first electrode 306 and the second electrode 312 are connected by electrical paths which pass three times in electrical series through the annulus 338 of variable resistance ink at different locations. This may increase the amount of change in resistance between the first electrode 306 and the second electrode 312 relative to the degree of deformation of the substrate 302. This may increase the gauge factor of the sensor 300.

Figure 8:
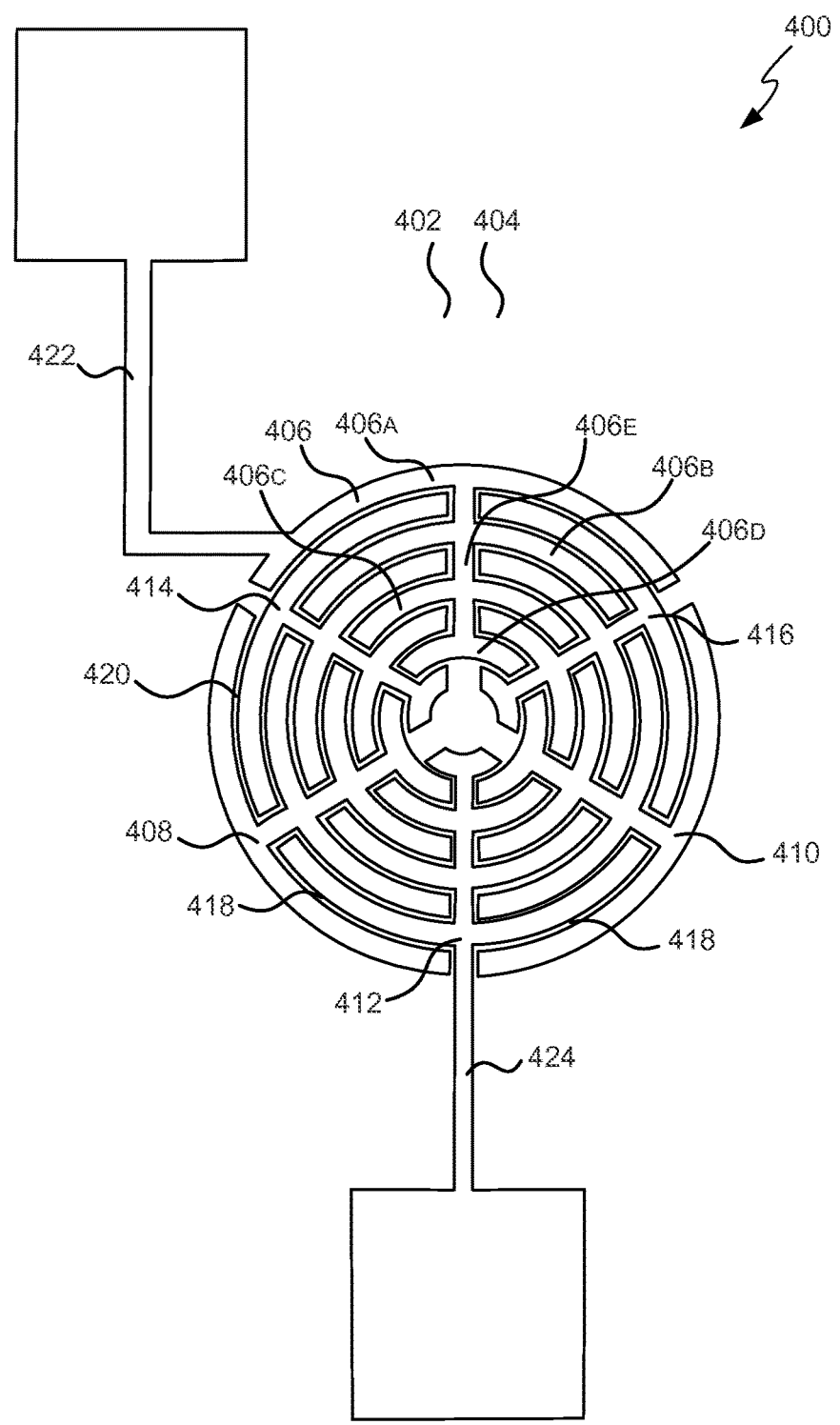
FIG. 8 illustrates a plan view of a schematic representation of a deformation sensor according to another illustrative example.

FIG. 8 illustrates a plan view of an example of a deformation sensor 400. The deformation sensor 400 comprises a substrate 402, and the deformation sensor 400 senses deformation of the substrate 402.

The substrate 402 has a surface 404, and six electrodes 406 to 416 on the surface 404 of the substrate 402. The six electrodes 406 to 416 comprise a first electrode 406, a second electrode 412, a third electrode 408, a fourth electrode 414, a fifth electrode 410, and a sixth electrode 416. The first electrode 406 comprises a set of four radially spaced apart circumferential conductors 406A to 406D linked by a radial connecting conductor 406E. The radial connecting conductor 406E links the circumferential conductors 406A to 406D at their respective mid-points so that each of the circumferential conductors 406A to 406D forms a pair of fingers extending in opposite directions from the radial connecting conductor 406E.

Each of the second to sixth electrodes 408 to 416 similarly comprises a set of four radially spaced apart circumferential conductors linked by a radial connecting conductor, so that each of the first to sixth electrodes 406 to 416 comprises two sets of four spaced apart fingers extending in opposite circumferential directions.

The first, third and fifth electrodes 406, 408 and 410 are arranged so that their sets of spaced apart fingers are interleaved with the sets of spaced apart fingers of the second, fourth and sixth electrodes 412, 414 and 416. Each of the first, third and fifth electrodes 406 to 410 extends for approximately one third of a circle, and each of the second, fourth and sixth electrodes 424 to 428 extends for approximately one third of a circle.

The electrodes 406 to 416 are arranged so that the spaced apart fingers of adjacent ones of the electrodes 406 to 416 are interlaced or interleaved with circumferential circular arcuate gaps 418 between the adjacent circumferential edges of the fingers of the adjacent electrodes 406 to 416. The spaced apart fingers of adjacent ones of the electrodes 406 to 416 are interleaved so that fingers of one electrode are located between fingers of another electrode. The gaps 418 between the adjacent interleaved fingers all have a width W. These circular arcuate gaps 418 are filled with respective circumferential bodies 420 of variable resistance ink. These bodies 420 of variable resistance ink have a width W. The circular arcuate gaps 418 and the circular arcuate bodies 420 of variable resistance ink defined between the interleaved fingers of the different electrodes 406 to 416 are arranged to form parts of a plurality of concentric circles, seven concentric circles in the example of FIG. 8.

Accordingly, the first electrode 406 is electrically connected to each of the fourth and sixth electrodes 414 and 416 by the bodies 420 of variable resistance ink between their respective sets of interleaved fingers, with a path length through the variable resistance ink between the first electrode 406 and the each of the fourth and sixth electrodes 414 and 416 being W throughout. Further, the fourth electrode 414 and the third electrode 408 are electrically connected by the bodies 420 of variable resistance ink between their respective sets of interleaved fingers, with a path length through the variable resistance ink between the fourth electrode 414 and the third electrode 408 being W throughout. Further, the sixth electrode 416 and the fifth electrode 410 are electrically connected by the bodies 420 of variable resistance ink between their respective sets of interleaved fingers, with a path length through the variable resistance ink between the sixth electrode 416 and the fifth electrode 410 being W throughout. Finally, the third and fifth electrodes 408 and 410 are each electrically connected to the second electrode 412 by the bodies 420 of variable resistance ink between their respective sets of interleaved fingers, with a path length through the variable resistance ink between each of the third and fifth electrodes 408 and 410 and the second electrode 412 being W throughout. Thus, the first electrode 406 and the second electrode 412 are connected by electrical paths which each pass three times in electrical series through the bodies 420 of variable resistance ink at different locations with each path length through the variable resistance ink being W.

A first conductive trace 422 connected to the first electrode 406 and a second conductive trace 424 connected to the second electrode 412 are also provided on the surface 404 of the substrate 402. The first and second conductive traces 422 and 424 provide electrical connections to the first and second electrodes 406 and 412 so that the resistance between them can be measured. The third electrode 408, fourth electrode 414, fifth electrode 410 and sixth electrode 416 do not have any conductive trace to allow external connection.

If the substrate 402 is deformed in a similar manner to the exemplary geometry shown in FIG. 4, the surface 404 on which the first to sixth electrodes 406 to 416, and the bodies 420 of variable resistance ink are located is deformed, and parts of the bodies 420 of variable resistance ink on the surface 404 are deformed. As a result, the width W of parts of the bodies 420 of variable resistance ink electrically connecting different ones of the first to sixth electrodes 406 to 416 are changed to a deformed width W+Δw or W-Δw. This deformation of the bodies 420 of variable resistance ink to increase or decrease its width causes the resistivity of the variable resistance ink to increase or decrease respectively, which causes a respective increase or decrease in the electrical resistance between the first electrode 406 and the second electrode 412.

Accordingly, the amount of deformation of the substrate 402 can be determined from measurements of the resistance between the first and second electrodes 406 and 412.

Similarly to the example of FIG. 7, in the example of FIG. 8 the first electrode 406 and the second electrode 412 are connected by electrical paths which pass three times in electrical series through the bodies 420 of variable resistance ink at different locations. This may increase the amount of change in resistance between the first electrode 406 and the second electrode 412 relative to the degree of deformation of the substrate 402. This may increase the gauge factor of the sensor 400.

The use of electrodes having interleaved fingers may increase the length of the circular arc of the gap containing the variable resistance ink electrically connecting different electrodes. This may increase the gauge factor of the sensor 400.

Figure 9:
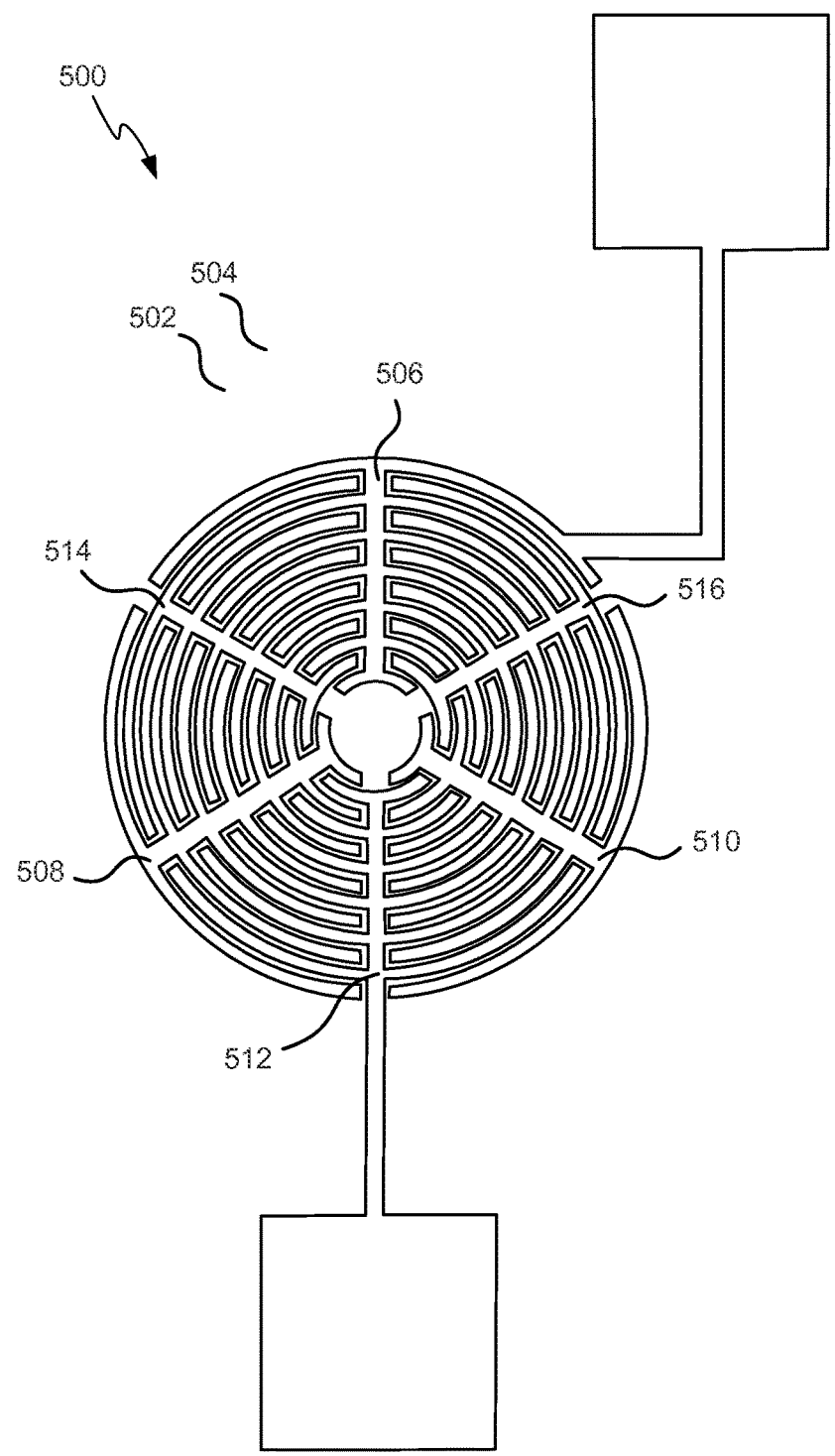
FIG. 9 illustrates a plan view of a schematic representation of a deformation sensor according to another illustrative example.

FIG. 9 illustrates a plan view of an example of a deformation sensor 500. The deformation sensor 500 comprises a substrate 502, and the deformation sensor 500 senses deformation of the substrate 502.

The substrate 502 has a surface 504, and six electrodes 506 to 516 on the surface 504 of the substrate 502. The six electrodes 506 to 516 comprise a first electrode 506, a second electrode 512, a third electrode 508, a fourth electrode 514, a fifth electrode 510, and a sixth electrode 516. The deformation sensor 500 is similar to the deformation sensor 400 illustrated in FIG. 9, except that each of the first, third and fifth electrodes 506 to 510 comprises a set of seven radially spaced apart circumferential conductors linked by a radial connecting conductor, so that each of the first, third and fifth electrodes 506 to 510 comprises two sets of seven spaced apart fingers extending in opposite circumferential directions, and each of the second, fourth and sixth electrodes 512 to 516 comprises a set of six radially spaced apart circumferential conductors linked by a radial connecting conductor so that each of the second, fourth and sixth electrodes 512 to 516 comprises two sets of six spaced apart fingers extending in opposite circumferential directions.

The circular arcuate gaps and the circular arcuate bodies of variable resistance ink defined between the interleaved fingers of the different electrodes 506 to 516 are arranged to form parts of a twelve concentric circles in the example of FIG. 8.

The use of electrodes having larger numbers of interleaved fingers may increase the length of the circular arc of the gap containing the variable resistance ink electrically connecting different electrodes. This may increase the gauge factor of the sensor 500.

As can be seen in FIGS. 8 and 9, in addition to the circular arcuate gaps between the edges of the interleaved fingers of the different electrodes, there will also be further gaps defined between the ends of some of the fingers and the radial connecting conductors of adjacent electrodes. In an example these further gaps may also have the same width W and contain the variable resistance material. In another example these further gaps may not contain variable resistance material.

Figure 10:
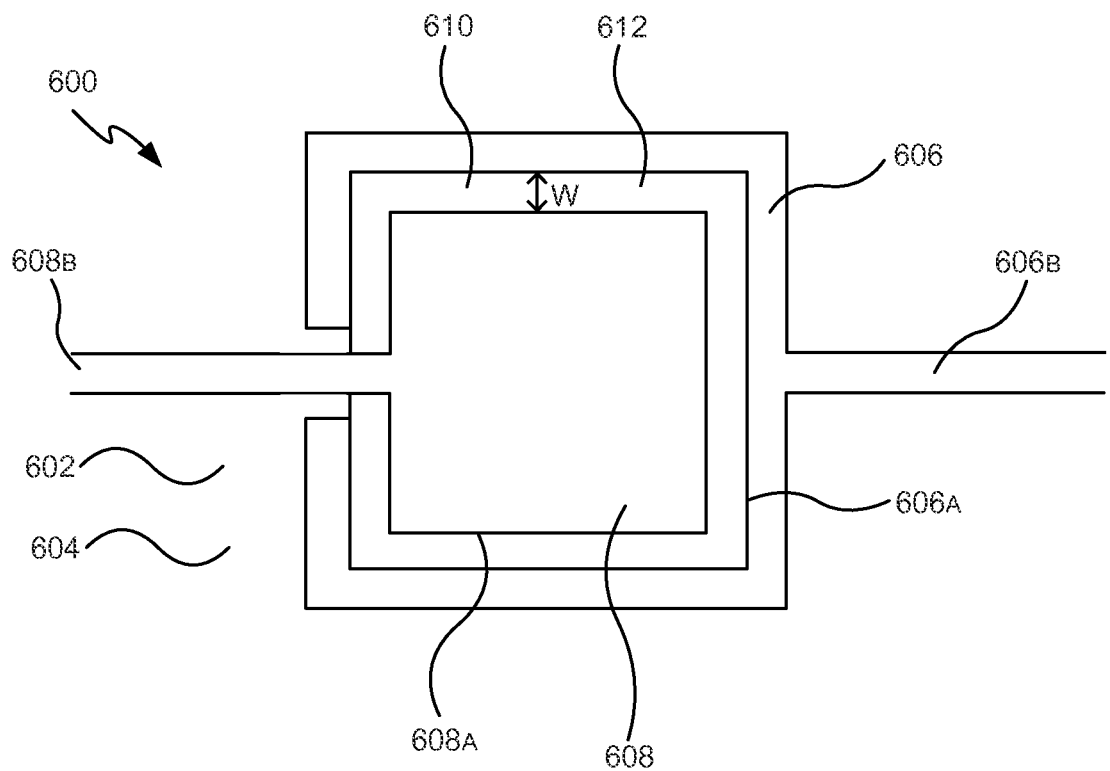
FIG. 10 illustrates a schematic representation of a deformation sensor according to another illustrative example.

FIG. 10 illustrates a plan view of an example of a deformation sensor 600.

The deformation sensor 600 comprises a substrate 602. The deformation sensor 600 senses deformation of the substrate 602. The substrate 602 has a surface 604, and a first electrode 606 and a second electrode 608 on the surface 604 of the substrate 602. The first and second electrodes 606 and 608 are arranged substantially concentrically with the second electrode 608 arranged inside the first electrode 606.

The first electrode 606 has an inner edge 606A, and the second electrode 608 has an outer edge 608A opposed to the inner edge 606A of the first electrode 606 so that the first and second electrodes 606 and 608 define a gap 610 between them. The gap 610 has a width W. The inner edge 606A of the first electrode 106 has a square shape, and the outer edge 608A of the second electrode 608 has a square shape concentric with the square shape of the inner edge 606A of the first electrode 606. Accordingly, the gap 610 is substantially a square shaped annulus.

The square gap 610 is filled by a square shaped body 612 of variable resistance ink on the surface 604 of the substrate 602, so that the square shaped body 612 of variable resistance ink has a width W. Thus, the first electrode 606 and the second electrode 608 are electrically connected by the variable resistance ink with a path length through the variable resistance ink between the first electrode 606 and the second electrode 608 being W.

A first conductive trace 606B connected to the first electrode 606 and a second conductive trace 608B connected to the second electrode 608 are also provided on the surface 604 of the substrate 600. The first and second conductive traces 606B and 608B provide electrical connections to the first and second electrodes 606 and 608 so that the resistance between them can be measured.

The first electrode 606 has a gap to allow the second conductive trace 608B to pass through the first electrode 606.

If the substrate 602 is deformed, the surface 604 on which the first and second electrodes 606 and 608, and the body 612 of variable resistance ink are located is deformed, and parts of the body 612 of variable resistance ink on the surface 604 are deformed. As a result, the width W of parts of the body 612 of variable resistance ink electrically connecting the first and second electrodes 606 and 608 are changed to a deformed width W+Δw or W-Δw. This deformation of the body 612 of variable resistance ink to increase or decrease its width causes the resistivity of the variable resistance ink to increase or decrease respectively, which causes a respective increase or decrease in the electrical resistance between the first electrode 606 and the second electrode 608.

Accordingly, the amount of deformation of the substrate 602 can be determined from measurements of the resistance between the first and second electrodes 606 and 608.

In other examples the electrodes may be arranged to define gaps containing variable resistance ink forming all or parts of other geometric shapes as an alternatives to circular arcs and squares. In an example the geometric shapes may be polygons. In an example the polygons may be regular polygons.

In examples the different examples of sensors described above for sensors having circular arcuate gaps may be applied to sensors having gaps forming all or parts of other geometric shapes. In some examples using electrodes having interleaved spaced apart fingers the gaps defined between the interleaved spaced apart fingers may form parts of a nested plurality of geometric shapes, that is, a plurality of geometric shapes arranged one inside another.

Figure 11:
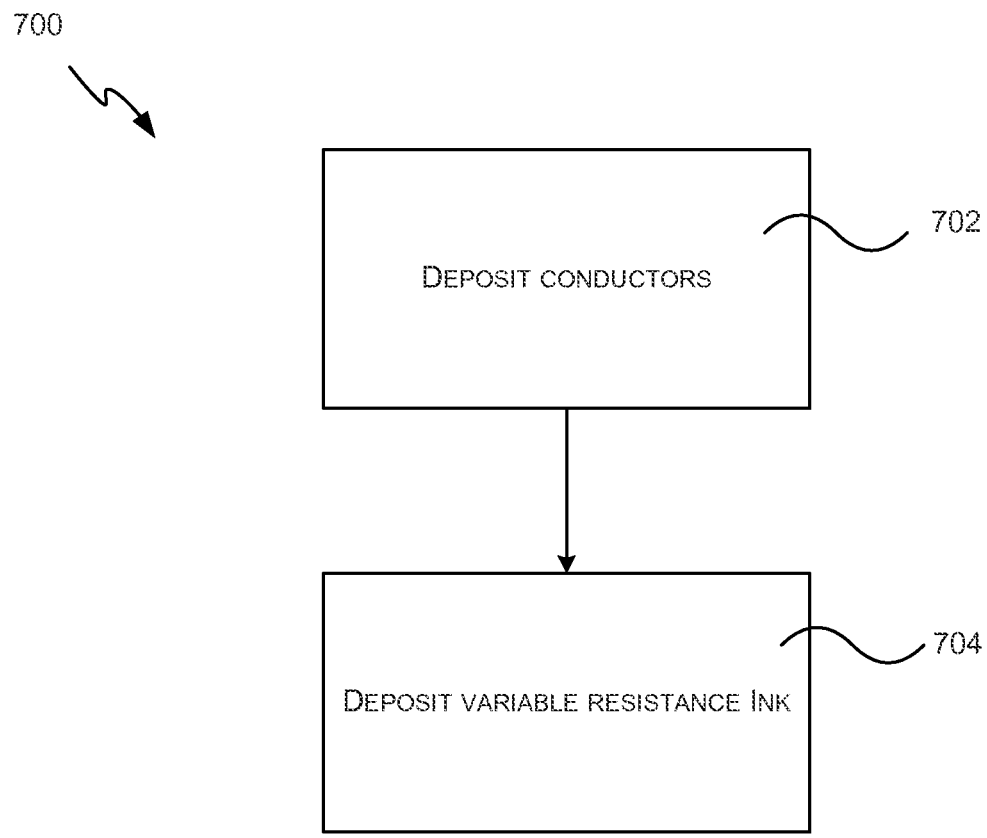
FIG. 11 illustrates an example of a sequence diagram of a method for manufacturing a deformation sensor.

FIG. 11 illustrates an example of a method 700 of a manufacturing process for providing a deformation sensor. In a block 702 there is deposited a layer of conductors on a substrate, the conductors defining a gap comprising at least one circular arc. In a block 704 there is deposited a layer of variable resistance ink wherein the variable resistance ink fills the at least one circular arc of the gap. The variable resistance ink being loaded with conductive or semiconductive nanoparticles whereby the resistance of the variable resistance ink changes when the ink is deformed.

Figure 12:
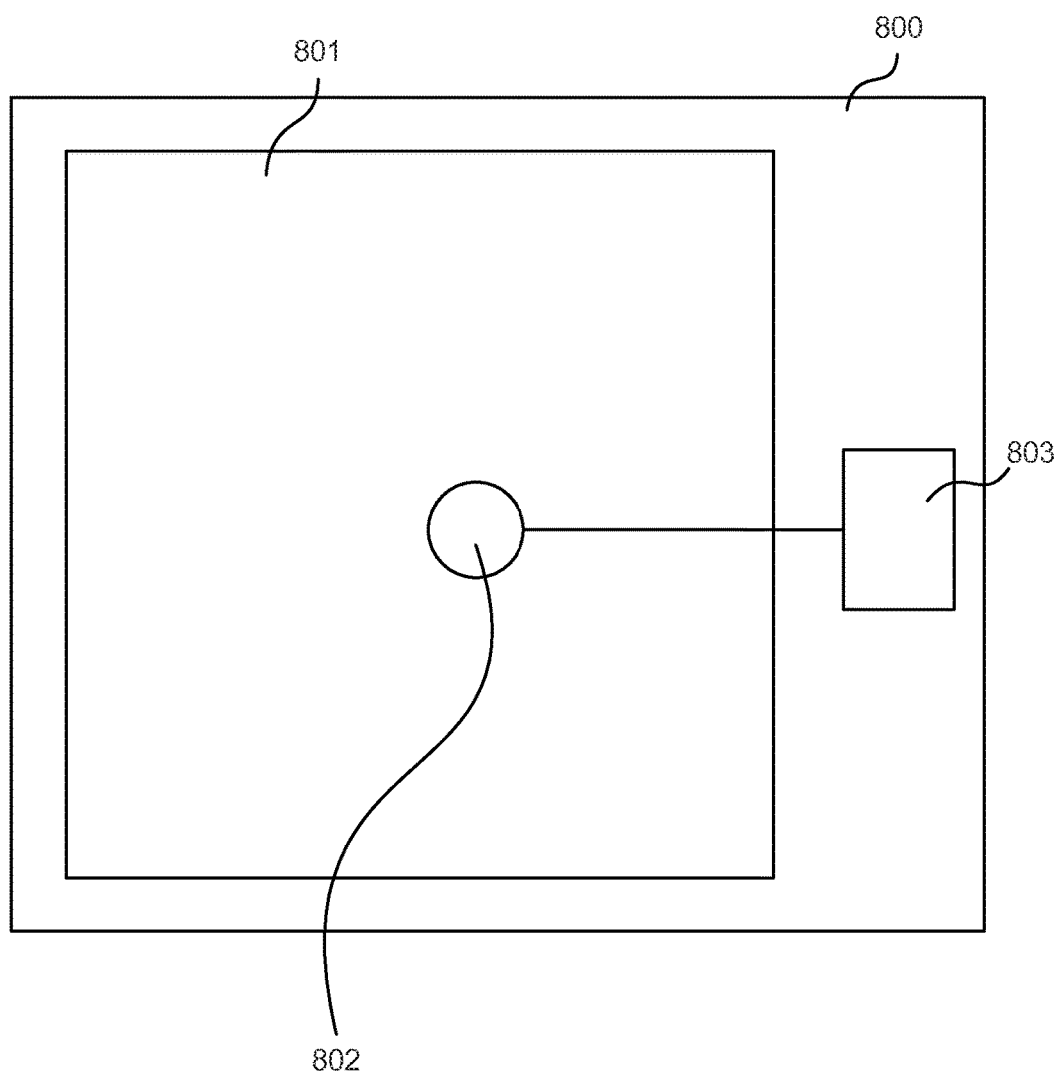
FIG. 12 illustrates a schematic representation of an example of a device incorporating a deformation sensor.

FIG. 12 illustrates an example of a device 800 comprising a deformation sensor according to one of the previous examples.

The device 800 comprises a touch sensitive panel 801. A deformation sensor 802 is mounted on the touch sensitive panel 801 so that the touch sensitive panel acts as the substrate of the deformation sensor 802. Accordingly, the deformation sensor 802 can be used to sense deformation of the touch sensitive panel 801.

The device 800 further comprises a controller 803 electrically connected to the deformation sensor and configured to measure the resistance of the deformation sensor 802. The controller 803 then identifies deformation of the touch sensitive panel 801 based upon the measured resistance of the deformation sensor 802. In some examples the controller 803 may identify a deformation of the touch sensitive panel 801 above a predetermined threshold as a user touch and respond accordingly.

The controller 803 may respond to identification of a user touch on the touch sensitive panel in any of the many ways in which a user input to a device may be responded to. For example, the controller 803 may trigger different predetermined functions of the device 800 based on the state of the device 800 when the user touch occurs, for example, different predetermined functions may be triggered depending on states of the device 800 such as the device 800 being idle, active, running an application, etc. For example, the controller 803 may trigger different predetermined functions of the device 800 based on the timing of identified user touches, for example the duration or sequence of user touches.

In some examples the controller 803 may identify the amount of deformation of the touch sensitive panel 801 as a user touch having a particular amount of force. In such examples the controller 803 may trigger different predetermined functions of the device 800 depending on the amount of force of the user touch, for example by triggering different predetermined functions when the amount of force of the user touch exceeds different threshold values.

In the example of FIG. 12 a single deformation sensor 802 is used. In other examples a plurality of spaced apart deformation sensors 802 may be used. In such examples the controller 803 may compare the deformation sensed by different ones of the plurality of spaced apart deformation sensors 802 to determine the number, location and/or movement of a touch or touches producing deformation of the touch sensitive panel 801. In such examples the controller 803 may trigger different predetermined functions of the device 800 depending on the number, position and/or movement of the user touch or touches.

In some examples the substrate of the deformation sensor may be attached to the touch sensitive panel so that the substrate of the deformation sensor is deformed together with the touch sensitive panel.

In some examples the touch sensitive panel 801 may be a touch sensitive display, or a part of a touch sensitive display.

In some examples the touch sensitive panel 801 may be a bendable touch sensitive display, or a part of a bendable touch sensitive display.

In some examples the blocks of the manufacturing method may be carried out in the opposite order.

In another example the gap may comprise at least a part of a geometric shape other than a circular arc.

In examples there may be two electrodes, or any number of electrodes more than two.

In examples the electrical path through the sensor may pass across a gap any number of times.

In examples the sensor may comprise a single gap or any number of gaps.

In an example the nanoparticles may have a size in the range from a few nanometers to hundreds of nanometers, such as in the range 10 nanometers to 200 nanometers. The nanoparticles may be made of any suitable material, for example conductive or semiconductive material so that the nanoparticles are conductive or semiconductive nanoparticles. Examples of conductive nanoparticles include metallic nanoparticles. Examples of semiconductive nanoparticles include semiconductor metal oxide nanoparticles. Examples of suitable materials for the nanoparticles include gold, platinum indium-tin oxide (ITO), carbon, and semiconductor materials, this is not intended to be an exhaustive list, and other materials may be used. The nanoparticles may have any suitable shape, for example nanowires, nanorods, or nanotubes. In an example the matrix 118 may be a polymer material. In another example the matrix 118 may be a carbon based material.

In an example the width W of the annulus of variable resistance ink and of the gap between the different electrodes, may be in the range 50 to 300 microns. In some examples the width W may be in the ranges 50 to 200 microns, 50 to 100 microns or 100 to 200 microns. In some examples the width W is at least several times the size of the nanoparticles.

In an example the electrodes and conductive traces may be formed of any suitable conductive material. Examples of suitable materials for the electrodes include metals, for example silver or copper, and carbon nanotubes. This is not intended to be an exhaustive list, and other materials may be used.

In the above examples the resistivity of the variable resistance ink varies as it is deformed and the resistance between the electrodes of the sensor is measured. It will be understood that the resistivity and conductivity of a material are closely related. In an example the conductivity of the ink may be considered to vary when the ink is deformed, and the conductivity between the electrodes of the sensor may be measured.

In the above examples a variable resistance ink is used. In an example a variable resistance material which is not an ink may be used.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The manufacturing methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A deformation sensor comprising:
   a substrate; and
   at least two electrodes on a surface of the substrate and separated by a gap, the electrodes being arranged to substantially surround the gap so that the gap comprises at least one part of a geometric shape and at least one electrode is inside the gap;
   the at least one part of a geometric shape of the gap containing a material loaded with conductive or semiconductive nanoparticles so that the at least two electrodes are electrically connected only by the material;
   whereby deformation of the substrate between two of the at least two electrodes causes a resistance between the two of the at least two electrodes to change, the resistance being measured between the electrodes of the sensor and across the gap;
   wherein each electrode of the at least two electrodes comprises a plurality of outwardly extending spaced apart fingers in which the outwardly extending spaced apart fingers of different electrodes of the at least two electrodes are interleaved;
   whereby the gap is formed of respective gaps that are defined between the interleaved fingers of the different electrodes.

2. The deformation sensor according to claim 1 wherein the gap has a constant width.

3. The deformation sensor according to claim 1 wherein the geometric shape is a polygon.

4. The deformation sensor according to claim 3 wherein the geometric shape is a regular polygon.

5. The deformation sensor according to claim 1 wherein the geometric shape is a circle and the gap comprises at least one circular arc.

6. The deformation sensor according to claim 1 wherein the at least two electrodes comprise more than two electrodes, and an electrical path between the two of the at least two electrodes crosses the gap containing the material loaded with conductive or semiconductive nanoparticles multiple times in electrical series.

7. The deformation sensor according to claim 1 wherein the gaps defined between the interleaved fingers of the different electrodes each comprise at least a part of a plurality of geometric shapes, the plurality of geometric shapes being nested.

8. The deformation sensor according to claim 1 wherein the material loaded with conductive or semiconductive nanoparticles is an ink.

9. The deformation sensor according to claim 1 wherein the material loaded with conductive or semiconductive nanoparticles is a functionalized nanoparticle material wherein the particles comprise the nanoparticles and ligand molecules.

10. The deformation sensor according to claim 1 wherein the material loaded with conductive or semiconductive nanoparticles changes resistivity when deformed based on quantum mechanical tunneling of electrons between the nanoparticles via ligand molecules.

11. A method of manufacturing a sensor, the method comprising:
    forming at least two electrodes on a surface of a substrate, the at least two electrodes being separated by a gap and the at least two electrodes being arranged to substantially surround the gap so that the gap comprises at least a part of a geometric shape and at least one electrode is inside the gap; and
    depositing a material loaded with conductive or semiconductive nanoparticles on the surface of the substrate;
    wherein the at least a part of a geometric shape of the gap contains the material loaded with conductive or semiconductive nanoparticles so that the at least two electrodes are electrically connected only by the material;
    whereby deformation of the substrate between two of the at least two electrodes causes a resistance between the two of the at least two electrodes to change, the resistance being measured between the electrodes of the sensor and across the gap;
    wherein each electrode of the at least two electrodes comprises a plurality of outwardly extending spaced apart fingers in which the outwardly extending spaced apart fingers of different electrodes of the at least two electrodes are interleaved;
    whereby the gap is formed of respective gaps that are defined between the interleaved fingers of the different electrodes.

12. The method according to claim 11 wherein the material loaded with conductive or semiconductive nanoparticles is an ink.

13. A deformation sensor comprising:
    a substrate; and
    at least two electrodes on a surface of the substrate and separated by a gap, the electrodes being arranged to substantially surround the gap so that the gap comprises at least one circular arc and at least one electrode is inside the gap;
    the at least one circular arc of the gap containing a material loaded with conductive or semiconductive nanoparticles so that the at least two electrodes are electrically connected only by the material;
    whereby deformation of the substrate between two of the at least two electrodes causes a resistance between the two of the at least two electrodes to change, the resistance being measured between the electrodes of the sensor and across the gap;
    wherein each electrode of the at least two electrodes comprises a plurality of outwardly extending spaced apart fingers in which the outwardly extending spaced apart fingers of different electrodes of the at least two electrodes are interleaved;
    whereby the gap is formed of respective gaps that are defined between the interleaved fingers of the different electrodes.

14. The deformation sensor according to claim 13 wherein the at least two electrodes comprise more than two electrodes, and an electrical path between the two of the at least two electrodes crosses the gap containing the material loaded with conductive or semiconductive nanoparticles multiple times in electrical series.

15. The deformation sensor according to claim 13 wherein the respective gaps defined between the interleaved fingers of the different electrodes each comprise at least one circular arc, the circular arcs being parts of a plurality of concentric circles.

16. The deformation sensor according to claim 13 wherein the material loaded with conductive or semiconductive nanoparticles is an ink.

17. The deformation sensor according to claim 13 wherein the material loaded with conductive or semiconductive nanoparticles is a functionalized nanoparticle material wherein the particles comprise the nanoparticles and ligand molecules.

18. The deformation sensor according to claim 13 wherein the material loaded with conductive or semiconductive nanoparticles changes resistivity when deformed based on quantum mechanical tunneling of electrons between the nanoparticles via ligand molecules.

\* \* \* \* \*